United States Patent [19]

Smith et al.

[11] 3,959,955

[45] June 1, 1976

[54] SELF CLEANING ROTARY LAWN MOWER BLADE AND DECK ASSEMBLY

[76] Inventors: David M. Smith, 600 E. Third St., Hobart, Ind. 46342; Frederick C. Mennen, 506 Clay St., La Porte, Ind. 46350

[22] Filed: Apr. 24, 1975

[21] Appl. No.: 571,490

[52] U.S. Cl. .................................. 56/17.5; 56/295
[51] Int. Cl.² ........................................ A01D 35/262
[58] Field of Search .................. 56/16.9, 295, 17.5, 56/17.4, 400; 37/43 L; 15/198, 102, 200, 201, 77

[56] References Cited
UNITED STATES PATENTS

| | | | |
|---|---|---|---|
| 1,414,305 | 4/1922 | Sandblom | 15/198 |
| 2,565,047 | 8/1951 | Rowland | 15/198 |
| 2,863,162 | 12/1958 | Draughon | 56/295 |
| 2,957,295 | 10/1960 | Brown | 56/295 |
| 3,051,972 | 9/1962 | Lacy | 56/295 |
| 3,184,903 | 5/1965 | Fjelstad | 56/17.5 |
| 3,358,431 | 12/1967 | Fitzgerald, Jr. | 56/17.5 |
| 3,396,518 | 8/1968 | Johnson | 56/17.5 |
| 3,531,927 | 10/1970 | Wood | 56/400 |
| 3,753,341 | 8/1973 | Berg, Jr. et al. | 56/295 |
| 3,857,226 | 12/1974 | Sifakas | 56/295 |

*Primary Examiner*—Russell R. Kinsey
*Assistant Examiner*—James D. Hamilton
*Attorney, Agent, or Firm*—Abraham A. Saffitz

[57] ABSTRACT

A self cleaning rotary lawn mower blade and deck assembly in which the lawn mower blade is provided with metal pins symmetrically mounted on opposite sides of the opening for the center shaft, the tops of the pins being spaced from the deck by a critical distance of one-fourth of an inch + or − 1/32 of an inch and being spaced from each other on from 2 to 4 inch centers, so that a 5 inch blade need only have four pins total, half on one side and half on the other side. The mounting of the pin is such that the pin shank whips through an angle of about 30°, e.g., about 15° each side of the normal vertical position and this whipping action which takes place during rotation of the blade removes debris, clippings, and the like which tend to adhere to the underside of the deck.

6 Claims, 12 Drawing Figures

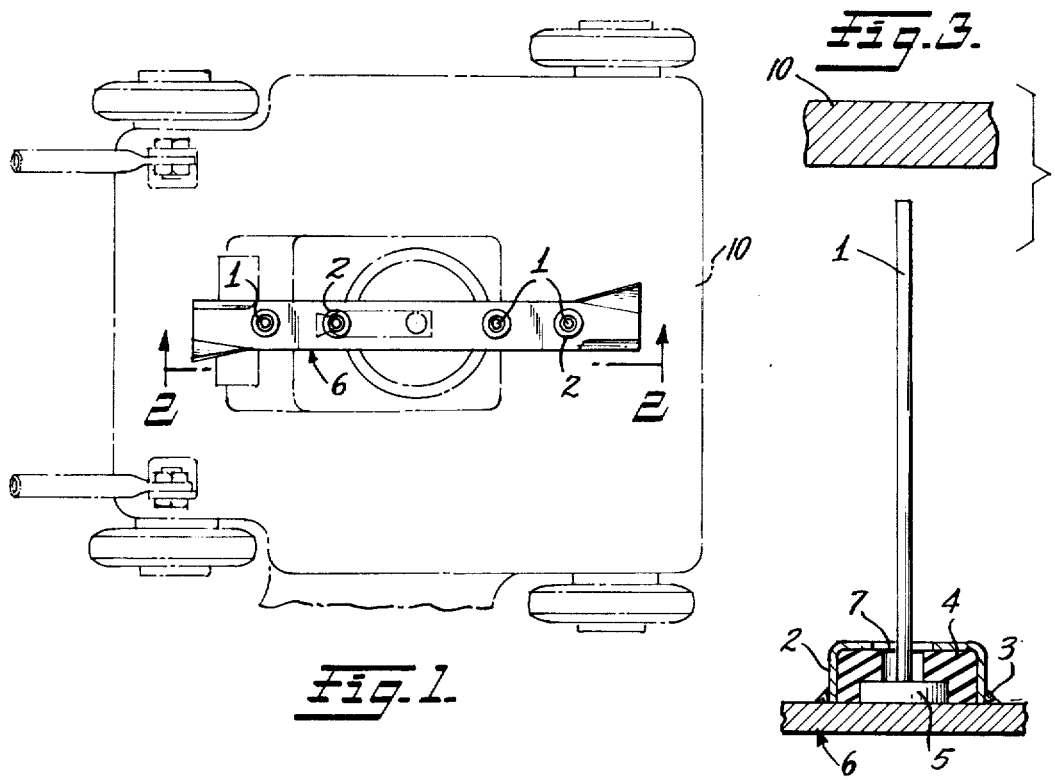
Fig.1.
Fig.3.
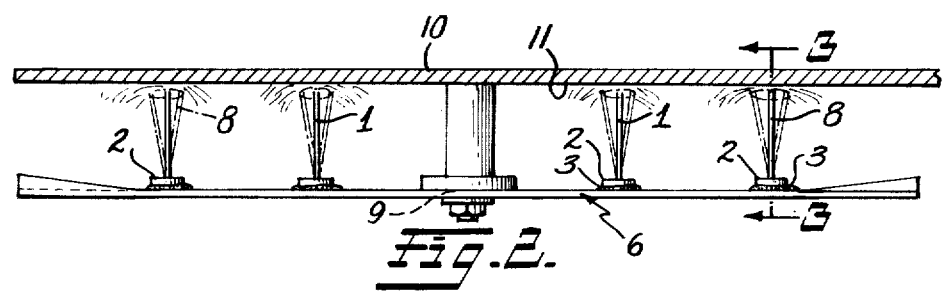
Fig.2.
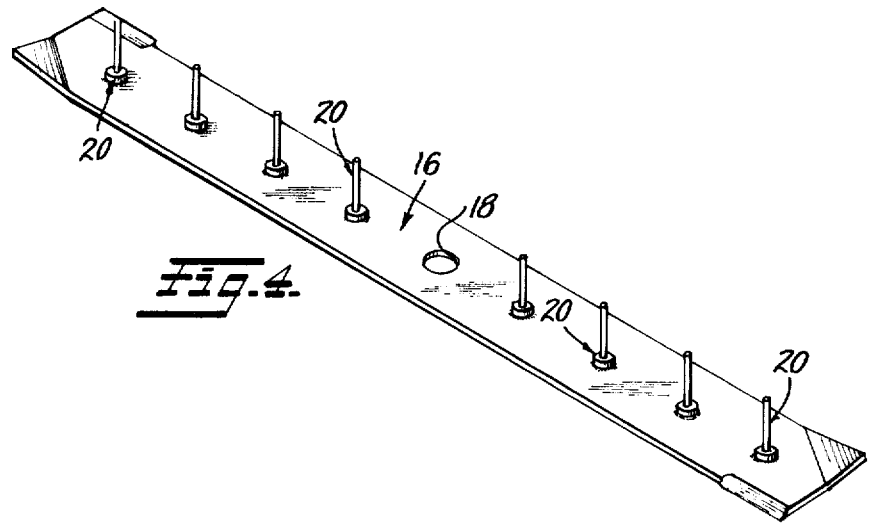
Fig.4.

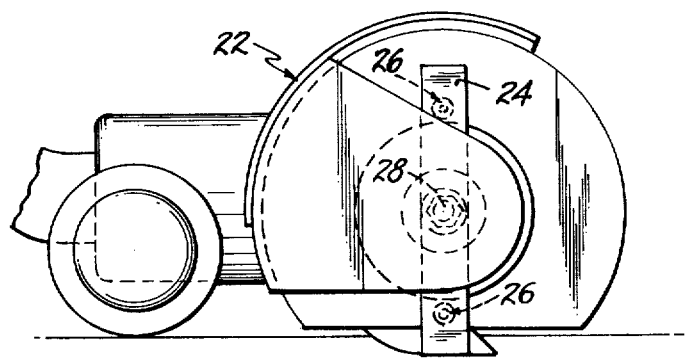
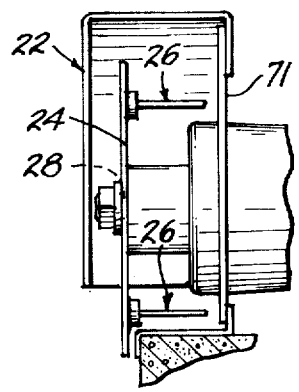
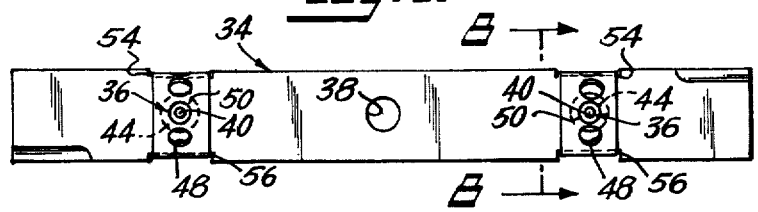
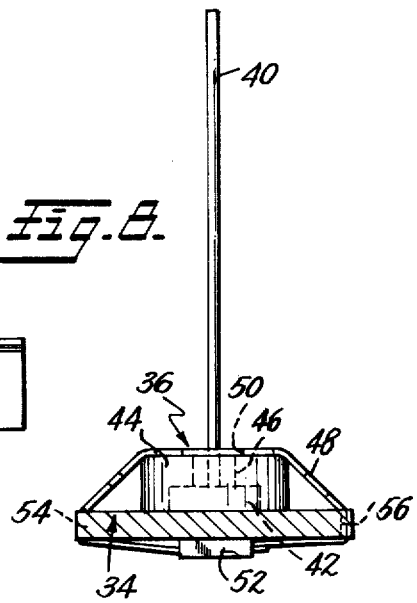
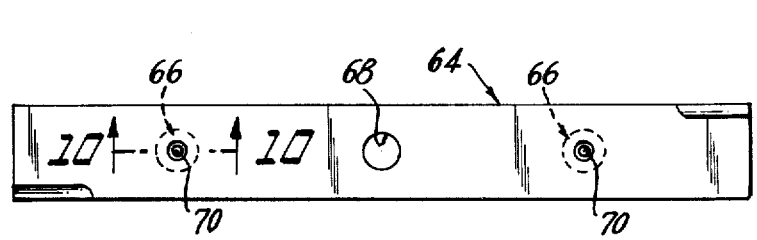
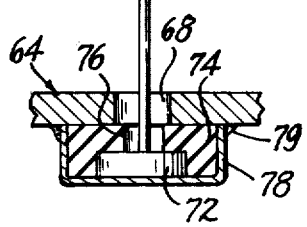
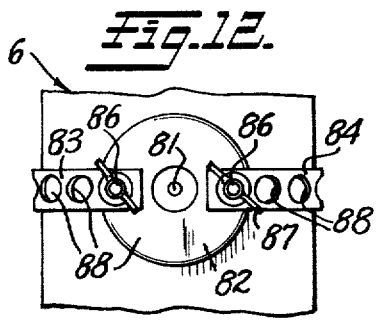
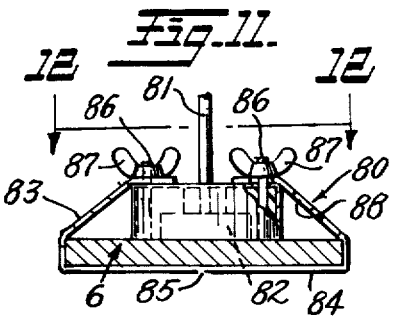

SELF CLEANING ROTARY LAWN MOWER BLADE AND DECK ASSEMBLY

BACKGROUND OF THE INVENTION

1. Field of the Invention

The invention is in the field of motorized harvesters having the motor on a ground-supported carrier with a rotatable blade mounted on the motor shaft, and the motorized vehicles of this type are the common and widely used self-propelled lawn mowers in which a novel provision is made for removing debris and cut clippings which accumulate on the underside of the deck by means of flexible metal pin attachments secured in symmetrical fashion to the cutter blade about the motor shaft opening thereof and at a critical spacing from the deck. The invention includes novel attachment means for the pins to the cutter blade.

2. Description of the Prior Art

In the prior art the patent to Brown, U.S. Pat. No. 2,957,295, and the patent to Johnson, U.S. Pat. No. 3,396,518, each teaches the concept for cleaning cut grass from the underside of the housing of rotary mower by bringing a scraper into direct contact with the underside. The scraper is a second element mounted on a common shaft with the blade. If the housing is flat as shown in Johnson and Brown, then there is no problem with the scraper doing its job, but the housing in most commercial moweres are not flat. Instead, they are curved as shown in the patent to Phillips, Jr. et al, U.S. Pat. No. 2,953,888. It is an essential requirement in Brown that the Brown end elements 19, which are curved and act as air scoops to blow away the grass clippings out of the chute 22 at the top of the mower. This pair of upstanding metal elements 19, which are bolted or riveted to the ends of the blade 11, has as the only function an air pumping action, because of the inclined air deflecting surface at 13 (see column 3 of Browm, lines 5 — 18).

The significant difference of the present invention over Brown and Johnson is that a single blade is used instead of two blades. The separate blade for scraping the ceiling of the housing has never been used because most housings are curved and because when stones are picked up by the blade, they jam the cleaning blade.

There is no concept in these prior art patents for the mounting of non-cutting pins as well as non-scraping pins, which do not come into contact with the underside of the housing, but rather come into contact with clippings of grass or debris which cling to the underside of the housing.

There is further no teaching in the prior art of a further critical limitation that the tip of the flexibly mounted pin be spaced from the surface of the housing underside by ¼ inch + or − 1/16 inch and that a pair of equally spaced pins on each side of the center shaft mounting opening can completely prevent the building up of clippings or debris on the underside of the housing.

OBJECTS OF THE INVENTION

Accordingly, it is an object of the invention to provide flexible non-cutting and non-scraping pins on the rotary blade, which pins come into contact with clippings of grass and debris collecting on the underside of the housing by maintaining a critical spacing of about ¼ inch from the tip to the underdeck and the thereby clean and prevent the buildup of clippings.

It is a further object of the invention to flexibly mount pins on the rotary lawn mower blade in spaced apart relation on opposite sides of the center of rotation, and with pins short of the underdeck by about ¼ inch, so that the pins are dynamically balanced during rotation of the blade.

It is a further object of the invention to mount a plurality of pins on opposite sides of the center of rotation of the lawn mower blade but spaced apart to a degree of closeness (about 3 to 5 inch centers) as will keep the entire underdeck clean when swept by the flexible pins, which extend about ¼ inch from the blade short of the underdeck.

It is still a further object of the invention to provide a mounting means for pins secured onto opposite sides of the center of rotation of the rotary mower blade which mounting means is flexible due to an elastomeric grommet which permits the end of the top which is about ¼ inch short of the underdeck to whip and thereby clean underdeck from clippings.

It is a further object of the invention to provide a clip on mounting means for the above pins which does not require boring a hole in the rotary blade or fastening by welding.

SUMMARY OF THE INVENTION

The invention is a self cleaning rotary lawn mower blade and deck assembly comprising flexible mounting means, which secure metal pins to the blade, there being at least one pin on each side of the center hole of the blade in symmetrical mounting whereby the normal rotation of the blade during cutting is not impaired, the shank of the pin extending to a critical distance of one-fourth of an inch + or − 1/32 of an inch from the underside of the deck so that the pin whips through an angle of about 15° on each side of the normal vertical position during rotation of the blade to remove debris, clippings, and the like which tend to adhere to the underside of the deck.

BRIEF DESCRIPTION OF THE DRAWINGS

FIG. 1 is a top plan view of a power lawn mower fitted with a 24 inch rotary blade showing the spaced apart relationship of the symmetrically spaced flexible mounting means and pins on both sides of the center shaft bore and the upper deck;

FIG. 2 is a vertical section view showing the spacing of the flexible pins along the length of the rotary blade and the critical spacing between the top of the pin and the underside of the deck;

FIG. 3 is a view of a single pin mounted on the blade showing the critical spacing relationship between the top of the single pin and the underside of the deck;

FIG. 4 is a prospective view of the blade of FIG. 2, which is detached from the hub and shaft of the power lawn mower;

FIG. 5 is a fragmentary side view of an edger or trimmer showing a modification of only two flexible shank members on a small diameter blade;

FIG. 6 is a fragmentary end view of the edger of FIG. 5;

FIG. 7 is a plan view of an alternate embodiment illustrating attachment of the flexible shank members by means of a strap to a cutter blade;

FIG. 8 is an enlarged transverse sectional view, taken on the line 8 —8 of FIG. 7;

FIG. 9 is a plan view of still another embodiment illustrating the flexible shank members assembled beneath the cutter blade; and, FIG. 10 is an enlarged fragmentary longitudinal sectional view, taken on the line 10 — 10 of FIG. 9.

FIG. 11 is an enlarged fragmentary vertical sectional view, similar to FIG. 8, showing another modification for mounting a pin shank housing on a mower blade; and, FIG. 12 is a fragmentary plan view of the mounting of FIG. 11, taken on the line 12 — 12 thereof.

DESCRIPTION OF THE PREFERRED EMBODIMENTS

The preferred embodiments illustrated in the drawings herein are directed to modifications, all of which provide pins symmetrically mounted on opposite sides of the center opening for the center shaft of the lawn mower blade in which the tops of the pins are spaced from the underside of the deck by a critical distance of about ¼ inch and which are each mounted in a mower to permit the shank of the pin to whip through an angle of about 15° on each side of the normal vertical.

In the embodiments of FIGS. 1 to 3, the mounting means for the pins is welded to the blade above the blade, e.g., on the upper surface thereof. In the embodiments of FIG. 4, a larger blade is illustrated but with the same symmetry so that high speed rotation will not induce rocking of the blade. In FIGS. 5 and 6, an edge trimmer is shown with a very short blade but the same principle of symmetry of pin mounting is followed. In FIGS. 7 and 8, the attachment of the pin by means of a strap, this eliminating the need for welding. In FIGS. 9 and 10, mounting is started from the underside of the blade in contrast to the mounting in FIG. 1. In FIGS. 11 and 12, mounting is by means of a special hinged fastener means fitted with wing nuts.

As shown in FIGS. 1 to 3, the symmetrically mounted metal pins which are flexibly secured on each side of the center opening 9 of the blade 6 have a pin shank 1 which extends upwardly from the head 5. Each pin head 5 has its upper portion held within the metal cap 2 by means of a flexible rubber or plastic grommet 4 and the central opening of the grommet 4 is wider than the top opening 7 in cap 2 (see FIG. 3), thus permitting a whip action shown in deflection 8 in FIG. 2. The critical spacing of one-fouth of an inch from the top end of the pin shank 1 to the underside of the deck 11 insures that only the shank whips back and forth during rotation of the cutter blade (24 inch blade in FIGS. 1 to 4) at an angle of about 15° on each sde of the vertical, while the head 5 is securely held below rubber or plastic grommet 4 with the metal cap 2 welded securely to the blade 6 as shown by weld fillet.

The critical ¼ inch spacing of the top of the shank 1 from the underside 11 of the deck is maintained for flat as well as curved protions of the deck so that pebbles or pieces of wood cut by the blade will be passed by the flexible shank. The spacing of the pins on about 4 inch centers provides balanced two pairs of pins on each side of the central opening 8 in a 24 inch blade.

This spacing of pins in an edger blade provides only one pin on each side of a small diameter 5 inch blade which in this case is on two inch diameters. The pin spacing is symmetrical in all installations whether on 2 inch centers about the center opening when in the 5 inch trimmer blade of FIG. 5 or on 4 inch centers in a 48 inch highway power mower blase as shown in FIG. 4.

The trimmer blade modification shown in the trimmer mower 22 of FIG. 5 can be seen in the profile in FIG. 7 and in side plan in FIG. 6. The same critical spacing of about ¼ inch from the side deck 71 is shown in FIG. 6 as pointed out above in connection with FIGS. 1 to 3.

The edger trimmer 22 is of the conventional type and is provided with 5 inch blade 24 having mounting opening 28. The blade 24 has mounted thereon the flexing shank assembly 26 in the same metal cap as used in FIGS. 1 to 3 and utilizing the same flexible grommet as used in this first modification, whereby the whipping action of the shank about 15° inch on each side of the perpendicular line to the blade occurs due to the relatively large opening 28 in the cap of the shank assembly 20.

In FIGS. 7 and 8 there is shown still another modification of a mounting for the flexible shank units utilizing flexible shank assemblies 36, these comprising a strap 48, such as is commercially available from Signode Strap Company, the strap 48 surrounding flexible shank assembly 36 and the blade 34 so that the assembly 36 can be secured to the blade by straping instead of by welding.

The interior of the flexible mounting cap portion of the assembly 36 is in the same as in FIGS. 1 to 3 and FIG. 5, namely, a rubber grommet overlying the head portion 42 and shank 40 extending to within ¼ inch of the underside of the deck while opening 46 in the cap 44 permits the whip action of shank 40, 15° on each side of the vertical, as in FIGS. 1 to 3 and in FIG. 5.

In FIGS. 9 and 10, there is shown still another embodiment of flexible mounting for the pins, which are critically spaced at about ¼ inch from the underside of the deck, wherein the flexible shank assemblies 66 are mounted on the underside rather than the upper side of the blade. In this embodiment of blade 64 and flexible shank assemblies 66, the opening 76 in the rubber grommet 74 as well as the opening 68 in the blade are both larger than the shank diameter of shank 70 so that the metal cap 78, which is securely welded to the underside of the blade 64 as shown by fillet 79 bears directly against the head portion 72 of the flexible pin.

FIGS. 11 and 12 illustrate the modification for fastening the same flexible shank assemblies comprising pin shank 81 having the metal cap 82 capture or enclose the base of the shank 81 within the confines of the metal cap 82. A hinged fastening means 80 is formed from a sheet of rigid metal or plastic about each side of the hinge 85, so that the bottom strap portions 84 on each side of the hinge serve to come into face to face contact with the underside of the mower blade 6. Continuing from the bottom strap portions 84, the side straps 83 extend to the top of the cap 82 and are fastened on each side of the pin shank 81 by means of studs 86 welded to the cap 82, there being one stud on each side. The ends of the studs 86 are threaded, and each of the studs 86 extend through the cap to provide a bottom surface of the stud which bears againt the upper surface of the lawn mower blade 6 and which lies wholly within the cap 82.

Because of the bearing engagement of the studs 86 against the top of the blade 6 wholly within the cap 82, the circular bottom edge of the cap and the two shank bottoms of the studs provide secure strapping of the pins, which is maintained by the tightening of wing nuts 87 on the threaded upper ends of the studs 86. As shown in FIG. 11, the studs 86 are welded to the cap 82 to assure alignment and rigid fastening.

To dismantle the pin mounting the wing nuts 87 are unscrewed, the side strap portion 83 is lifted from the studs and the hinge 85 permits bending back the bottom portions 84 of the strap for simple removal.

Obviously, for certain uses where it is not desired to bore holes in the blade, the strapping arrangement of FIGS. 7 and 8 is preferred. In still other uses where welding machinery is available, the embodiments of FIGS. 1 to 3 may be preferred and in certain cases it may be desired to mount the flexible pin assemblies from the underside as in FIGS. 9 and 10.

Having thus disclosed the invention, what is claimed is:

1. A self cleaning power driven rotary lawn mower and deck assembly in which grass clippings and debris sticking to the underside of the deck assembly are removed solely by the rotating action of the lawn mower blade comprising:

a blade having a central mounting opening;

metal pins each having a head and a shank projecting towards said deck mounted on opposite sides of the central opening which mounts the blade on the power motor of the mower to permit balanced rotation of said blade;

flexible mounting means on said blade at the base of said pins for securing the pins to said blade;

said flexible mounting means including a cap surrounding said head, an elastic grommet in said cap, and an opening permitting whip movement of the shank to about 15° on each side of the normal perpendicular extension of said shank; and, the tip of said shank extending to about ¼ inch from the underside of said deck whereby whipping movement at the shank ends removes the debris from the deck;

2. A mower blade and deck assembly as claimed in claim 1 wherein said flexible mounting means includes a strap which secures the cap to said blade.

3. A mower blade and deck assembly as claimed in claim 1 wherein said flexible mounting means includes a strap welded to said blade.

4. A mower blade and deck assembly as claimed in claim 3 wherein said cap is welded to the top of said blade.

5. A mower blade and deck assembly claimed in claim 3 wherein said cap is welded to the bottom of said blade and said blade is bored to permit said shank to extend from the underside of the blade through the top and towards the deck.

6. A mower blade and deck assembly as claimed in claim 3 wherein the deck is at the side and the mower is an edge trimmer.

* * * * *